United States Patent
McKay et al.

(10) Patent No.: US 11,442,612 B2
(45) Date of Patent: Sep. 13, 2022

(54) METHOD AND APPARATUS FOR FACILITATING USER CHAT INTERACTIONS

(71) Applicant: [24]7.ai, Inc., San Jose, CA (US)

(72) Inventors: Neil McKay, Santa Cruz, CA (US); Rhetto Sean Lazo, San Jose, CA (US)

(73) Assignee: [24]7.ai, Inc., Campbell, CA (US)

( * ) Notice: Subject to any disclaimer, the term of this patent is extended or adjusted under 35 U.S.C. 154(b) by 265 days.

(21) Appl. No.: 15/390,126

(22) Filed: Dec. 23, 2016

(65) Prior Publication Data

US 2018/0181286 A1    Jun. 28, 2018

(51) Int. Cl.
*G06F 3/0485* (2022.01)
*H04L 51/046* (2022.01)
*G06F 3/04883* (2022.01)
*G06F 3/04845* (2022.01)

(52) U.S. Cl.
CPC ........ *G06F 3/0485* (2013.01); *G06F 3/04845* (2013.01); *H04L 51/046* (2013.01); *G06F 3/04883* (2013.01); *G06F 2203/04803* (2013.01)

(58) Field of Classification Search
CPC .. G06F 3/0484; G06F 3/0485; G06F 3/04883; G06F 2203/04803; G06F 3/04886; G06F 16/2452; H04L 51/046
See application file for complete search history.

(56) References Cited

U.S. PATENT DOCUMENTS

| 7,089,278 | B1* | 8/2006 | Churchill | G06Q 10/10 |
| | | | | 709/203 |
| 7,712,044 | B2* | 5/2010 | Lin-Hendel | G06F 3/0485 |
| | | | | 715/785 |
| 9,874,990 | B2* | 1/2018 | Khalatian | G06Q 50/01 |
| 2003/0005134 | A1* | 1/2003 | Martin | G06Q 30/02 |
| | | | | 709/229 |
| 2003/0011639 | A1* | 1/2003 | Webb | G06F 3/0481 |
| | | | | 715/808 |
| 2004/0130575 | A1* | 7/2004 | Tai | G06F 3/04886 |
| | | | | 715/773 |

(Continued)

OTHER PUBLICATIONS

PCTUS1767933. Outgoing Written Opinion of the ISA. dated Mar. 8, 2018. 4 pages (Year: 2018).*

(Continued)

*Primary Examiner* — David S Posigian
(74) *Attorney, Agent, or Firm* — Perkins Coie LLP; Michael Glenn

(57) ABSTRACT

A computer-implemented method and an apparatus facilitate user chat interactions. A chat widget offering chat-based assistance is displayed on one or more Web pages of an enterprise Website. In response to a user selection of the chat widget, a chat window is displayed at a first predetermined position on a Web page. The chat window is repositioned to a second predetermined position in response to a user input indicative of provisioning of a text input. The repositioning of the chat window enables display of a virtual keyboard. The placement of the chat window and the virtual keyboard enables the user to view a substantial portion of the Web page. The chat window is caused to scroll with the Web page in response to a Web page scroll input provided by the user and slide back to a previous position subsequent to completion of a scroll movement of the Web page.

17 Claims, 10 Drawing Sheets

(56) References Cited

U.S. PATENT DOCUMENTS

| | | | |
|---|---|---|---|
| 2006/0031404 A1* | 2/2006 | Kassab | G06F 17/30893 709/218 |
| 2006/0150117 A1* | 7/2006 | Fujita | G06F 3/0481 715/788 |
| 2007/0130089 A1* | 6/2007 | Chiu | G06Q 30/02 705/400 |
| 2007/0245249 A1* | 10/2007 | Weisberg | G06F 9/451 715/758 |
| 2009/0164940 A1* | 6/2009 | Wampler | G06Q 30/02 715/808 |
| 2009/0273565 A1* | 11/2009 | Garside | G06F 3/03545 345/168 |
| 2010/0037153 A1* | 2/2010 | Rogers | G06F 3/0481 715/758 |
| 2010/0281357 A1* | 11/2010 | Fu | G06F 9/452 715/234 |
| 2011/0161863 A1* | 6/2011 | Rainisto | G06F 9/451 715/784 |
| 2011/0302520 A1* | 12/2011 | Yuasa | H04N 1/00413 715/773 |
| 2012/0075231 A1* | 3/2012 | Kwahk | G06F 3/0488 345/173 |
| 2012/0109741 A1* | 5/2012 | Ballapragada | G06Q 30/0244 705/14.43 |
| 2012/0254729 A1* | 10/2012 | Wan | G06F 17/30905 715/234 |
| 2013/0091439 A1 | 4/2013 | Sirpal et al. | |
| 2015/0149645 A1 | 5/2015 | Mendez et al. | |
| 2015/0310377 A1* | 10/2015 | Schlumberger | G06Q 10/063114 705/7.15 |
| 2016/0179323 A1* | 6/2016 | Kashi | H04L 65/1069 715/708 |
| 2016/0202865 A1* | 7/2016 | Dakin | G06F 3/0485 715/784 |
| 2016/0313906 A1* | 10/2016 | Kilchenko | G06N 3/0436 |

OTHER PUBLICATIONS

PSTATZ. Floating content in I-frames. Article posted Feb. 15, 2010 in Wired online magazine. Retrieved on [Oct. 22, 2018]. 15 pages (Year: 2010).*

Frost, Brad. Fixed position in mobile browsers. Blog post dated Nov. 10, 2011. Retrieved from http://bradfrost.com/blog/post/fixed-position/] on [Oct. 22, 2018]. 17 pages. (Year: 2011).*

Dion, Jeff. 'Creating a Floating HTML Menu Using jQuery and CSS'. In Envato Tuts+ [online]. Jun. 27, 2008 [retrieved on Mar. 6, 2020]. Retrieved from the Internet: <https://code.tutsplus.com/tutorials/creating-a-floating-html-menu-using-jquery-and-css--net-40> (Year: 2008).*

* cited by examiner

METHOD AND APPARATUS FOR FACILITATING USER CHAT INTERACTIONS

TECHNICAL FIELD

The present invention generally relates to interactions between enterprises and users of enterprise offerings, and more particularly to a method and apparatus for facilitating chat interactions between users and agents of an enterprise.

BACKGROUND

Existing and potential users of enterprise offerings routinely engage in interactions with the enterprises to enquire about products/services of interest, to resolve concerns, to make payments, to lodge complaints, etc. The interactions may be conducted over one or more interaction channels, such as a Web channel, a voice channel, a chat channel, an interactive voice response (IVR) channel, a social media channel, a native mobile application channel, and the like.

Generally, engaging in one-to-one chat conversations with visitors to an enterprise Website has been known to boost sales of an enterprise and/or improve a quality of user interaction experiences. Such live chat support solutions typically involve displaying a chat option on Web pages of the Website. An online visitor to the Website may select the chat option to initiate an interaction with an agent of an enterprise. The selection of the chat option may result in display of a chat window. On touch-enabled devices, if a user wants to communicate via an input field of the chat window, a virtual keyboard may be displayed to the user. Upon display of the virtual keyboard, the chat window may be moved to a position directly above the virtual keyboard.

Some existing techniques opt for a full screen chat experience, where the chat window may occupy a full screen of a mobile device. However, full screen chat windows may prevent the user from scrolling the host Website with the chat window and the virtual keyboard displayed. Further, in some solutions the chat window may get pushed above a screen view of the mobile device when the virtual keyboard is displayed due. As a result, a header of the chat widget may not be accessible unless the user scrolls up to a top of the chat window or collapses the virtual keyboard.

Other existing solutions may affix the chat window to a bottom or a side portion of a Web page, which may enable the user to scroll the host Website with the chat window open. However, in some cases the user may be taken away from a focal point on the host Website when the keyboard opens because the Web page may scroll to the bottom. In some other solutions, the chat window may disappear below the Web page when the user attempts to scroll the Web page thereby disorienting the user, specifically when the user may be typing a message in the chat window.

In some scenarios, when the user attempts to navigate the host Website with the chat window open and the virtual keyboard displayed, certain browser related issues may occur. For example, a jarring flicker effect may occur when the user attempts to scroll the Web page with the chat window open. The movement of the chat window due to the scrolling input provided by the user may cause the back-end server to recalculate the position of the chat window on the Web page, thereby causing the jarring flicker effect. Moreover, when the user attempts to scroll the Web page with the chat window open and virtual keyboard displayed, the Web page may appear locked and, in addition to the flickering, the Website may snap back to the top of the Web page, thereby preventing the user from scrolling the Web page.

As such, existing mechanisms for positioning chat windows and scrolling a host website simultaneously pose several limitations. Accordingly, there is a need to overcome the aforementioned drawbacks and facilitate user chat interactions in a hassle-free manner.

SUMMARY

In an embodiment of the invention, a computer-implemented method for facilitating user chat interactions is disclosed. The method effects, by a processor, display of a chat widget on one or more Web pages of a Website associated with an enterprise. In response to a user selection input corresponding to the chat widget displayed on the Web page, the method effects, by the processor, display of a chat window at a first predetermined position on a Web page of the Website. The chat window facilitates a chat interaction between the user and an agent associated with the enterprise. The display of the chat window at the first predetermined position is configured to retain display of a substantial portion of the Web page to the user. In response to an input indicative of provisioning of a text input from the user, the method causes, by the processor, repositioning of the chat window to a second predetermined position to enable display of a virtual keyboard at a portion of the Web page including the first predetermined position. In response to a scroll input corresponding to the Web page from the user during the chat interaction between the user and the entity, the method causes, by the processor, the chat window to scroll with the Web page and slide to a previous position subsequent to completion of a scroll movement of the Web page. The previous position corresponds to a position of the chat window prior to the scroll movement of the Web page.

In another embodiment of the invention, an apparatus for facilitating user chat interactions includes at least one processor and a memory. The memory stores machine executable instructions therein that, when executed by the at least one processor, cause the apparatus to effect display of a chat widget on one or more Web pages of a Website associated with an enterprise. In response to a user selection input corresponding to the chat widget displayed on the Web page, the apparatus effects display of a chat window at a first predetermined position on a Web page of the Website. The chat window facilitates a chat interaction between the user and an agent of the enterprise. The display of the chat window at the first predetermined position retains display of a substantial portion of the Web page to the user. In response to an input indicative of provisioning of a text input from the user, the apparatus repositions the chat window to a second predetermined position to display a virtual keyboard at a portion of the Web page comprising the first predetermined position. In response to a scroll input corresponding to the Web page from the user during the chat interaction between the user and the agent, the apparatus causes the chat window to scroll with the Web page and slide to a previous position subsequent to completion of a scroll movement of the Web page. The previous position corresponds to a position of the chat window prior to the scroll movement of the Web page.

In another embodiment of the invention, a computer program product for facilitating user chat interactions includes at least one computer-readable storage medium. The computer-readable storage medium includes a set of instructions which, when executed by one or more processors, cause an electronic device to effect display of a chat widget on one or more Web pages of a Website associated with an enterprise. In response to a user selection input corresponding to the chat widget displayed on the Web page, the electronic device effects display of a chat window at a first predetermined position on a Web page of the Website. The chat window facilitates a chat interaction between the user and an entity associated with the enterprise. The display of the chat window at the first predetermined position retains a substantial portion of the Web page for display to the user. In response to an input indicative of provisioning of a text input from the user, the electronic device repositions the chat window to a second predetermined position to enable display of a virtual keyboard at a portion of the Web page comprising the first predetermined position. In response to a scroll input corresponding to the Web page from the user during the chat interaction between the user and the entity, the electronic device scrolls the chat window with the Web page and slides the chat window to a previous position subsequent to completion of a scroll movement of the Web page. The previous position corresponds to a position of the chat window prior to the scroll movement of the Web page.

DETAILED DESCRIPTION

Figure 1:
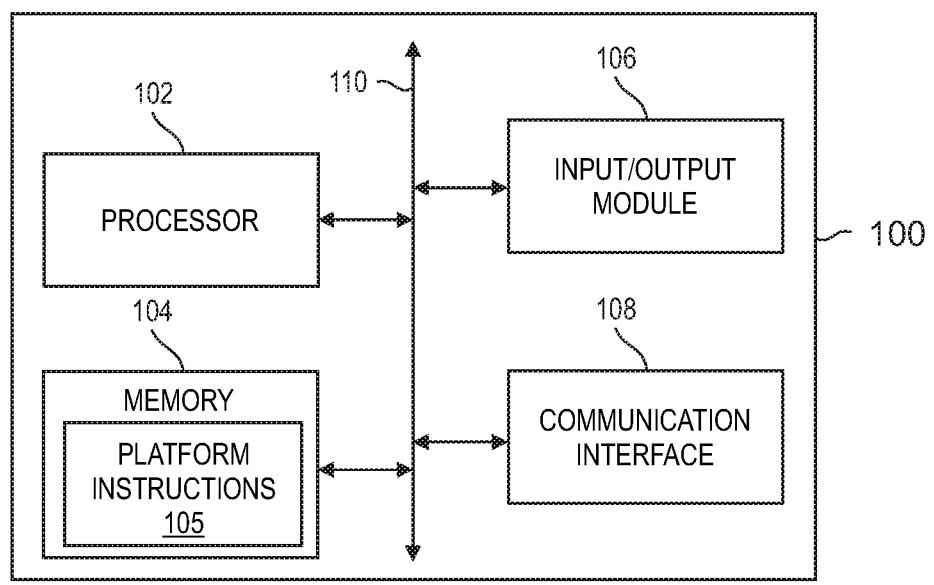
FIG. 1 is a block diagram of an apparatus configured to facilitate user chat interactions in accordance with an embodiment of the invention.

The detailed description provided below in connection with the appended drawings is intended as a description of the present invention and is not intended to represent the only forms in which the present invention may be constructed or used. However, the same or equivalent functions and sequences may be accomplished by different forms.

Online visitors to an enterprise Website, hereinafter referred to as users, may wish to seek assistance during their journey on the Website. For example, a user may need assistance on troubleshooting a feature of a recently purchased product from the enterprise. In another illustrative example, a user may wish to reschedule a flight itinerary. Typically, a widget offering chat-based assistance is displayed on most enterprise Websites. A user may click on the widget to initiate an interaction with a customer support representative. Clicking on the widget may result in a display of a chat window. Some chat applications may provide a full screen view of the chat window. However, such full screen chat windows may prevent the user from scrolling the host Website while the chat window is open. Further, in case of touch-enabled devices, a virtual keyboard may be displayed on the Web page when the user wants to provision text input into the chat window. In some chat solutions, the chat window may get pushed above a screen view of the Website when the virtual keyboard is displayed. As a result, a header of the chat widget may not be accessible unless the user scrolls up to a top of the chat window.

In some other chat solutions, the chat window may not occupy the entire viewable screen space and may instead be affixed to a bottom or a side portion of the Web page to enable the user to scroll the host Website with the chat window open. However, a jarring flicker effect may occur when the user attempts to scroll the Web page with the chat window open. The movement of the chat window results due to the scrolling input provided by the user, which may cause the back-end server to recalculate the position of the chat window on the Web page, thereby causing the jarring flicker effect. Moreover, when the user attempts to scroll the Webpage with the chat window open and a virtual keyboard displayed, the Web page may appear locked and, in addition to the flickering, the Website may snap back to the top of the Web page, thereby preventing the user from scrolling the Web page.

Various embodiments of the present invention provide a method, apparatus, and computer program product that overcome these and other obstacles and provide additional benefits. More specifically, various embodiments of the present invention disclose techniques for facilitating user chat interactions in a hassle-free manner. The user can scroll the host Website when the chat window and the virtual keyboard are open without any jarring or flicker effect. Furthermore, the chat window is configured to be dynamically resized to fit the viewport of the electronic device if an orientation of the electronic device is such that a height of the chat window on top of the virtual keyboard exceeds the screen height. The user may also drag the chat window to any desired position on the screen to view portion of the Website covered by the chat window. An example apparatus for facilitating user chat interactions is explained with reference to FIG. 1.

FIG. 1 is a block diagram of an apparatus 100 configured to facilitate user chat interactions in accordance with an embodiment of the invention. The term 'user' as used herein refers to an existing or a potential user of enterprise's products, services and/or information offerings. The term 'enterprise' as used herein may refer to a banking enterprise, an educational institution, a financial trading enterprise, an aviation company, a social media enterprise, a consumer goods enterprise, or any such public or private sector enterprise.

A user may visit an enterprise interaction channel, such as an enterprise Website for a variety of purposes. For example, a user may visit the enterprise Website to learn about new offers, to make purchase transactions, to pay bills, etc. In some scenarios, while browsing the enterprise Website the user may need assistance in comprehending information on the Website or in performing an activity on the Website, and may need to engage in a one-to-one chat conversation with a customer support representative of the enterprise. The term 'facilitating user chat interactions' as used herein refers to chat interactions between users and customer support representatives, such as human or virtual agents, of the enterprise. In some example embodiments, the term user interactions may also correspond to chat interactions between two users of an enterprise's offerings, conducted on the enterprise Website.

The apparatus 100 includes at least one processor, such as a processor 102, and a memory 104. It is noted that although the apparatus 100 is depicted to include only one processor, the apparatus 100 may include any number of processors therein. In an embodiment, the memory 104 is capable of storing machine executable instructions, referred to herein as platform instructions 105. Further, the processor 102 is capable of executing the platform instructions 105. In an embodiment, the processor 102 may be embodied as a multi-core processor, a single core processor, or a combination of one or more multi-core processors and one or more single core processors. For example, the processor 102 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 102 may be configured to execute hard-coded functionality. In an embodiment, the processor 102 is embodied as an executor of software instructions, wherein the instructions may specifically configure the processor 102 to perform the algorithms and/or operations described herein when the instructions are executed.

The memory 104 may be embodied as one or more volatile memory devices, one or more non-volatile memory devices, and/or a combination of one or more volatile memory devices and non-volatile memory devices. For example, the memory 104 may be embodied as magnetic storage devices, such as hard disk drives, floppy disks, magnetic tapes, etc.; optical magnetic storage devices, e.g. magneto-optical disks; CD-ROM (compact disc read only memory); CD-R (compact disc recordable); CD-R/W (compact disc rewritable); DVD (Digital Versatile Disc); BD (BLU-RAY® Disc); and semiconductor memories, such as mask ROM, PROM (programmable ROM), EPROM (erasable PROM), flash memory, RAM (random access memory), etc.

The memory 104 stores a chat application capable of being used by a remote Web server hosting the enterprise Website to facilitate chat interactions on the Website. An instance of the chat application may be downloaded on the Web server, which may then communicate with the chat application using application programming interfaces (APIs) to facilitate user chat interactions. The chat application may also provide logic and routines to enable the repositioning of a chat window to various positions on the Web page, as will be explained later.

The apparatus 100 also includes an input/output module 106 (hereinafter referred to as 'I/O module 106') and at least one communication interface, such as the communication interface 108. In an embodiment, the I/O module 106 may include mechanisms configured to receive inputs from, and provide outputs to, the user of the apparatus 100. To that effect, the I/O module 106 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 102 may include I/O circuitry configured to control at least some functions of one or more elements of the I/O module 106, such as, for example, a speaker, a microphone, a display, and/or the like. The processor 102 and/or the I/O circuitry may be configured to control one or more functions of the one or more elements of the I/O module 106 through computer program instructions, for example, software and/or firmware, stored on a memory, for example, the memory 104, and/or the like, accessible to the processor 102.

The communication interface 108 may include several channel interfaces to communicate with a plurality of enterprise interaction channels. Some non-limiting examples of the enterprise interaction channels may include a Web channel, i.e. an enterprise Website; a voice channel, i.e. voice-based customer support; a chat channel, i.e. a chat support; a native mobile application channel; a social media channel; and the like. Each channel interface may be associated with a respective communication circuitry such as, for example, a transceiver circuitry including antenna and other communication media interfaces to connect to a wired and/or wireless communication network. The communication circuitry associated with each channel interface may, in at least some example embodiments, enable transmission of data signals and/or reception of signals from remote network entities, such as Web servers hosting enterprise Website or a server at a customer support or service center configured to maintain real-time information related to interactions between users and agents.

In at least one example embodiment, the channel interfaces are configured to receive up-to-date information related to the customer-enterprise interactions from the enterprise interaction channels. In some embodiments, the information may also be collated from the plurality of devices used by the customers. To that effect, the communication interface 108 may be in operative communication with various customer touch points, such as electronic devices associated with the customers, Websites visited by the customers, devices used by customer support representatives, for example voice agents, chat agents, IVR systems, in-store agents, and the like, engaged by the customers and the like.

The communication interface 108 may further be configured to receive information related to current journeys of online visitors on enterprise interaction channels, such as enterprise Websites, in real-time and provide the information to the processor 102. In at least some embodiments, the communication interface 108 may include relevant APIs to communicate with remote data gathering servers associated with such enterprise interaction channels. Moreover, the communication between the communication interface 108 and the remote data gathering servers may be realized over various types of wired or wireless networks.

In an embodiment, various components of the apparatus 100, such as the processor 102, the memory 104, the I/O module 106, and the communication interface 108 are configured to communicate with each other via or through a centralized circuit system 110. The centralized circuit system 110 may be various devices configured to, among other things, provide or enable communication between the components (102-108) of the apparatus 100. In certain embodiments, the centralized circuit system 110 may be a central printed circuit board (PCB) such as a motherboard, a main board, a system board, or a logic board. The centralized circuit system 110 may also, or alternatively, include other printed circuit assemblies (PCAs) or communication channel media.

The apparatus 100 as illustrated and hereinafter described is merely illustrative of an apparatus that could benefit from embodiments of the invention and, therefore, should not be taken to limit the scope of the invention. It is noted that the apparatus 100 may include fewer or more components than those depicted in FIG. 2. In an embodiment, the apparatus 100 may be implemented as a platform including a mix of existing open systems, proprietary systems, and third party systems. In another embodiment, the apparatus 100 may be implemented completely as a platform including a set of software layers on top of existing hardware systems. In an embodiment, one or more components of the apparatus 100 may be deployed in a Web Server. In another embodiment, the apparatus 100 may be a standalone component in a remote machine connected to a communication network and capable of executing a set of instructions, sequential and/or otherwise, to facilitate user chat interactions. Moreover, the apparatus 100 may be implemented as a centralized system or, alternatively, the various components of the apparatus 100 may be deployed in a distributed manner while being operatively coupled to each other. In an embodiment, one or more functionalities of the apparatus 100 may also be embodied as a client within devices, such as customers' devices. In another embodiment, the apparatus 100 may be a central system that is shared by or accessible to each of such devices.

The facilitating of the user chat interactions by the apparatus 100 is hereinafter explained with reference to one user. It is noted the apparatus 100 may be caused to facilitate chat interactions for several users in a similar manner.

In at least one example embodiment, the processor 102 is configured to, with the content of the memory 104, cause the apparatus 100 to effect display of a chat widget on one or more Web pages of a Website associated with an enterprise. As explained above, the communication interface 108 is in operative communication with a Web server hosting the enterprise Website. The processor 102 of the apparatus 100 may cause, for example by using chat application APIs to communicate with the Web Server, to display a chat widget on one or more Web page of the Website. A user accessing the Website using a personal electronic device may view the chat widget displayed on the Web pages of the Website. The display of the chat widget is depicted in FIG. 2.

Figure 2:
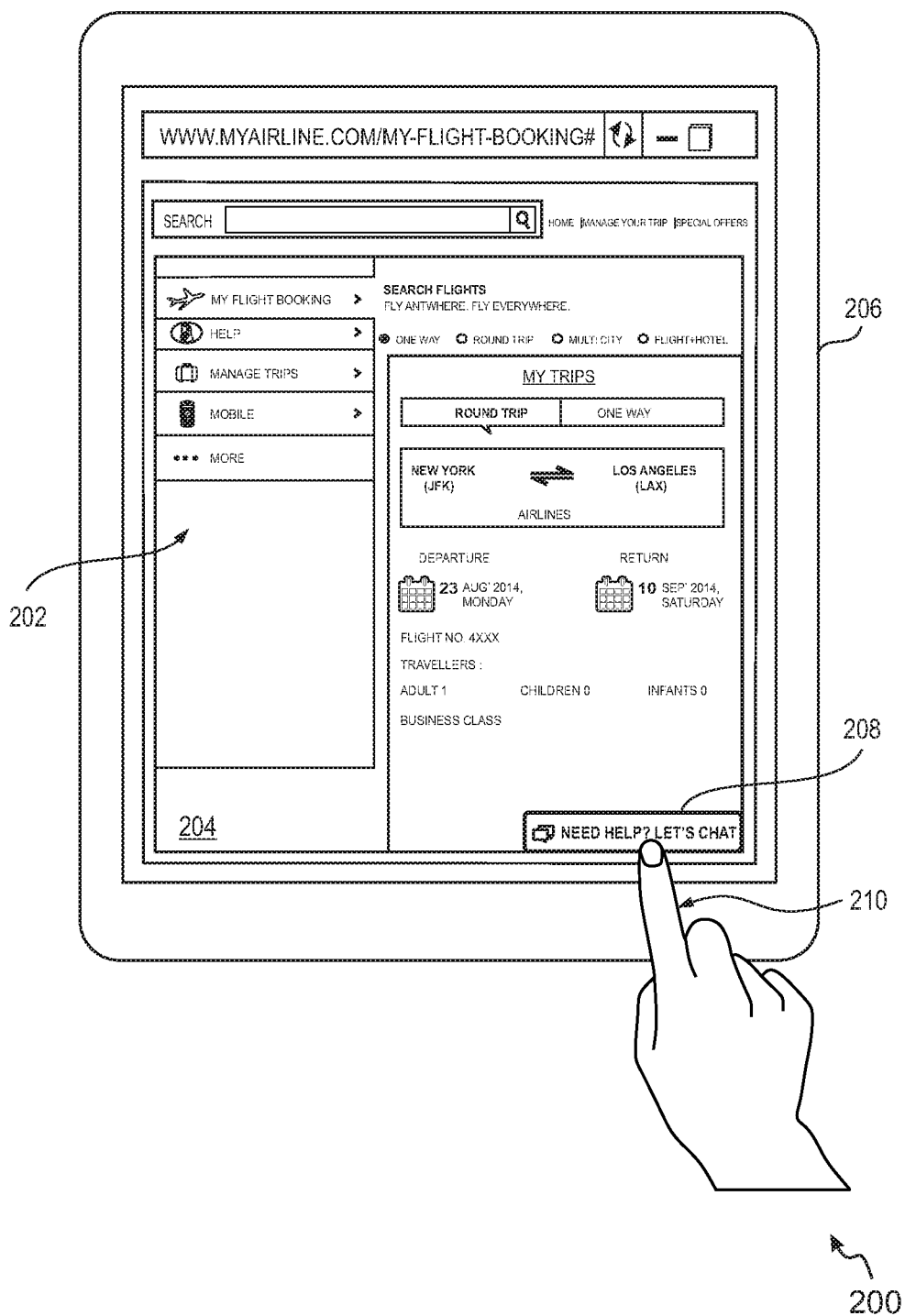
FIG. 2 shows an example representation of a Web page displayed on a display screen of a touch-enabled electronic device in accordance with an embodiment of the invention.

Referring now to FIG. 2, an example representation 200 of a Web page 202 displayed on a display screen 204 of a touch-enabled electronic device 206 is shown in accordance with an embodiment of the invention. The electronic device 206 is depicted to be a tablet device for illustration purposes. In some example embodiments, the electronic device 206 may correspond to any touch-enabled device, such as a Smartphone, a touch-enabled laptop or a desktop computer screen, a wearable device, and the like. The Web page 202 may be one of several Web pages associated with the enterprise Website. The Web page 202 is depicted to display content related to scheduling a flight trip for illustrations purposes. As explained above, the enterprise may correspond to any private or public sector enterprise and as such, the enterprise Website may display content related to products, services, and/or information offered by the corresponding enterprise. A user may visit the Website of the enterprise using a Web browser application installed on the electronic device 206. In an example scenario, the Website, i.e. one or more Web pages configuring the Website, may be hosted on a remote Web server and the Web browser application may be configured to retrieve one or more Web pages associated with the Website over a communication network. Some examples of the communication network may include wired networks, wireless networks, or a combination thereof. Some examples of wired networks may include Ethernet, local area networks (LANs), fiber-optic cable networks, and the like. Some examples of wireless networks may include cellular networks, such as GSM/3G/4G/CDMA networks, wireless LANs, blue-tooth or Zigbee networks, and the like. An example of a combination of wired and wireless networks may include the Internet.

The Web page 202 is depicted to display a chat widget 208 displaying text: 'Need Help, Let's Chat.' In many example scenarios, users may wish to speak with a customer support representative of an enterprise such as, for example, a human agent or a virtual agent capable of assisting the users with their respective needs. Accordingly, a user may provide a selection input on the chat widget 208, for example a touch input as exemplarily depicted by 210, to initiate an interaction with the customer support representative of the enterprise.

Referring now to FIG. 1, in at least one example embodiment, the processor 102 is configured to, with the content of the memory 104, cause the apparatus 100 to effect display of a chat window at a first predetermined position on a Web page of the Website in response to a user selection input. As explained with reference to FIG. 2, a chat widget, such as the chat widget 208, is displayed on one or more Web pages of an enterprise Website. A user seeking assistance may provide a selection input, such as the touch input 210 depicted in FIG. 2, corresponding to the chat widget. The apparatus 100 may be caused to receive the user selection input using the communication interface 108. In an illustrative example, each Web page of the enterprise Website may be tagged with Hyperlink Text Markup Language (HTML) tags or JavaScript tags, which invoke a call function if the tagged content on the Web page is selected by a user. Accordingly, the touch input on the chat widget may be captured by the tags and recorded in a database in the Web server, which may be then be relayed to communication interface 108 in substantially real-time. The processor 102 of the apparatus 100 may receive information related to user selection input from the communication interface 108 and effect display of a chat window on the Web page in response to the user selection input. The display of the chat window may be effected using relevant chat application APIs of the chat application stored in the memory 104 and instance of the chat application stored in the Web server hosting the enterprise Website.

In at least one example embodiment, the displayed chat window facilitates a chat interaction between the user and an agent of the enterprise. The agent of the enterprise may correspond to a human agent or a virtual agent, for example a chatbot, deployed by the enterprise to assist the users seeking assistance on the Website. The chat window may be displayed at a first predetermined position on the Web page of the Website. In at least one example embodiment, the first predetermined position corresponds to a bottom-right corner portion of a viewport of an electronic device displaying the Web page to the user. The term 'viewport' as used herein refers to a visible area or a viewable portion of a display screen of the electronic device. It is understood that the viewport may vary with a type of the electronic device. For example, a mobile phone may have a viewport of smaller size than that of a desktop computer. The display of the chat window at the first predetermined position, such as the bottom-right corner portion of the viewport, may be performed to retain display of a substantial portion of the Web page to the user. It is noted that the first predetermined position may correspond to any other position on the Web page, which retains display of a substantial portion of the Web page to the user. The term 'substantial portion of the Web page' as used herein implies that only a fraction of a viewable portion of the Web page is covered by the chat window and that the user may still be able to view a majority of the content portions of the Web page. The display of the chat window at the first predetermined position is depicted in FIG. 3A.

Figure 3A:
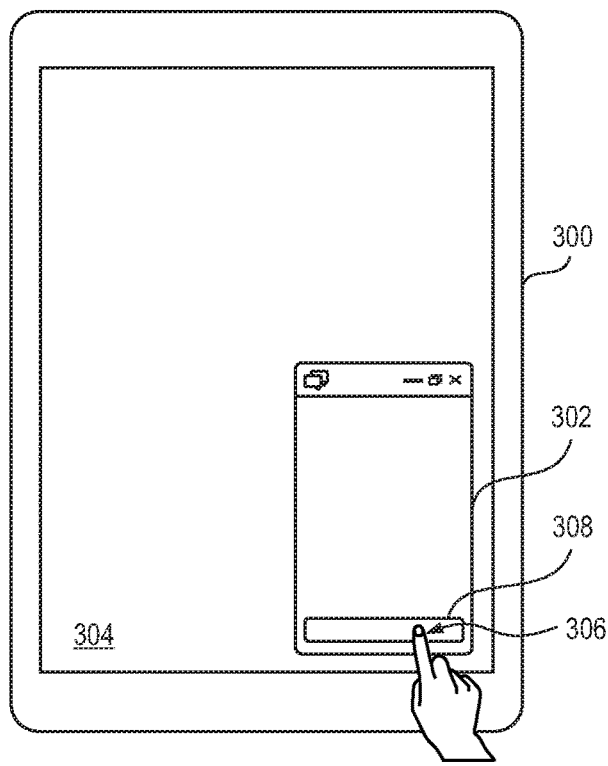
FIG. 3A shows an example representation of an electronic device displaying a chat window on a Web page of a Website in response to user selection input of the chat widget is shown in accordance with an embodiment of the invention.

Referring now to FIG. 3A, an example representation of an electronic device 300 displaying a chat window 302 on a Web page 304 of a Website in response to user selection input of the chat widget is shown in accordance with an embodiment of the invention. The Web page 304 is depicted to be devoid of content for illustration purposes. It is understood that the Web page 304 may include content, such as the content displayed on the Web page 202.

As explained with reference to FIG. 1, the apparatus 100 may effect display of the chat window in response to the user selection input on the chat widget displayed on the Web page of the Website. The chat window 302 is depicted to be displayed in a first predetermined position, such as the bottom-right corner portion of the viewport, i.e. viewable area of the display screen, as depicted in FIG. 3A. The user may provide an input, such as a touch input as exemplarily depicted by input 306, in the text input area 308 of the chat window 302 to initiate a chat interaction with the agent of the enterprise.

Figure 3B:
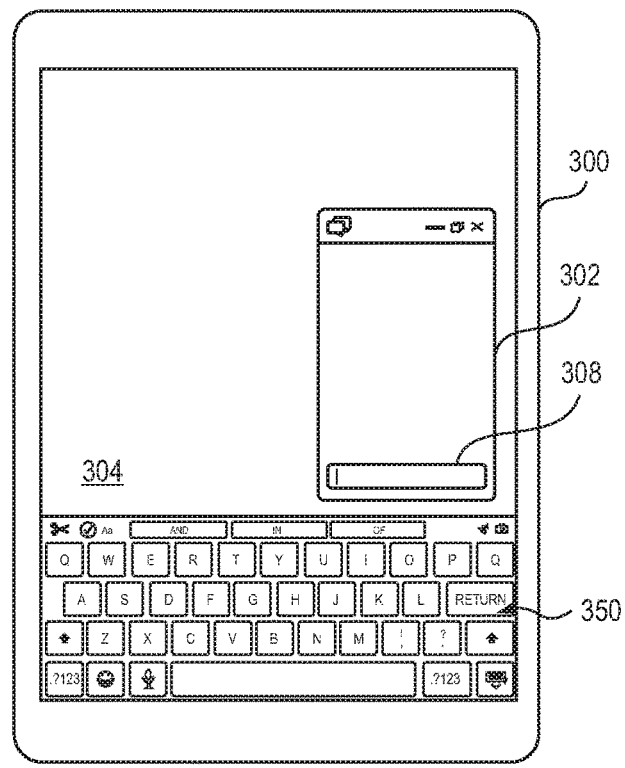
FIG. 3B shows an example representation of the electronic device of FIG. 3A displaying the chat window repositioned to the second predetermined position on the Web page of a Website in accordance with an embodiment of the invention.

Referring now to FIG. 1, in at least one example embodiment, the processor 102 is configured to, with the content of the memory 104, cause the apparatus 100 to reposition the chat window to a second predetermined position in response to an input indicative of provisioning of a text input from the user. In an illustrative example, information related to the touch input, such as the input 306, in the text input area of a chat window may be communicated by the chat application APIs in the Web server to the communication interface 108 of the apparatus 100. The processor 102 of the apparatus 100 may then be caused to reposition the chat window to a second predetermined position to enable display of a virtual keyboard at a portion of the Web page including the first predetermined position. More specifically, the indication of provision of a text input in the text input area of the chat window may signal the Web server to cause display of the virtual keyboard to enable the user to input textual entry in the text input area. The virtual keyboard is a native component of the electronic device and it is typically displayed on the bottom portion of the viewport, which encompasses the first predetermined position, such as the bottom-right corner portion of the viewport. Accordingly, the apparatus 100 may reposition the chat window to a second predetermined position, such as for example, a position above the virtual keyboard as exemplarily depicted in FIG. 3B. More specifically, FIG. 3B shows an example representation of the electronic device 300 of FIG. 3A displaying the chat window 302 repositioned to the second predetermined position on the Web page 304 of a Website in accordance with an embodiment of the invention. The repositioning of the chat window 302 to the second predetermined position from the bottom-right corner portion of the viewport may be performed to accommodate a virtual keyboard, such as the virtual keyboard 350, which is invoked in response to the user input indicative of indicative of provisioning of a text input from the user. As can be seen in FIG. 3B, the virtual keyboard 350 is placed on the bottom portion of the viewport of the electronic device 300 encompassing the bottom-right corner portion of the viewport, i.e. the first predetermined position. Accordingly, the apparatus 100 is caused to reposition the chat window 302 to accommodate the virtual keyboard 350.

Referring now to FIG. 1, in at least one example embodiment, the processor 102 is configured to, with the content of the memory 104, cause the apparatus 100 to cause the chat window to scroll with the Web page in response to a Web page scroll input provided by the user. The chat window is then caused to slide to a previous position subsequent to completion of a scroll movement of the Web page. In at least one example embodiment, the processor 102 is caused to maintain a record of a current position of the chat window, for example the first predetermined position or the second predetermined position or any other position on the keyboard in the memory 104. The storing of the current position of the keyboard facilitates sliding back of the chat window to a previous position, i.e. a position of the chat window prior to the scroll movement of the Web page.

In an illustrative example, the user may wish to learn about a new offer displayed on an enterprise Website and accordingly initiate a chat interaction by clicking on the chat widget and then providing a query input in the text input area in the displayed chat window. While interacting with the agent using the chat medium, the user may wish to select specific portions of content related to the offer for which the user needs clarification. Accordingly, the user may provide a scroll input, for example a single continuous scroll input or multiple step scroll inputs, on the Web page to view the desired content. The scroll input may cause scroll movement of the Web page. In at least one example embodiment, the apparatus 100 may cause the chat window to scroll along with Web page and slide back to a previous position subsequent to the completion of the scroll movement of the Web page.

Typically, in conventional mechanisms, if the Web page is scrolled when the chat window (and/or virtual keyboard) is in open configuration, a jarring or flicker effect is observed as the Web page script at the back-end recalculates the position of the chat window. The split-second calculation of the chat window subsequent to scrolling of the Web page causes the jarring/flicker effect. The scrolling of the chat window along with Web page precludes the coupling of the chat window to the top of the keyboard or to the bottom-right corner portion of the viewport, thereby avoiding recalculation of the position of the chat window and the associated jarring/flicker effect. The repositioning of the chat window is further explained with reference to FIGS. 4A, 4B and 4C.

Figure 4A:
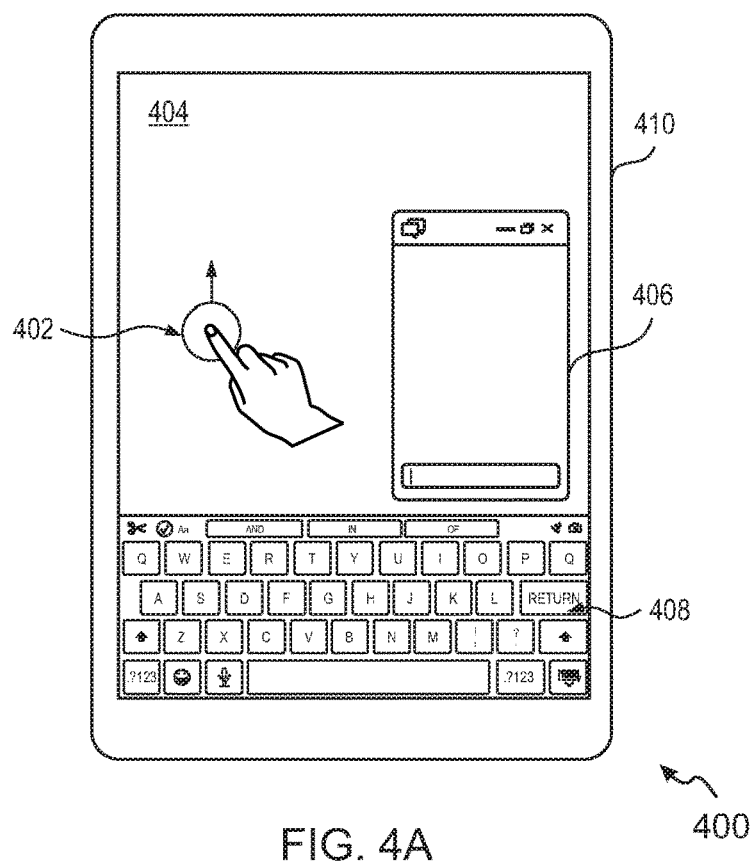
FIGS. 4A-4C depict example representations for illustrating a repositioning of a chat window in response to a Web page scroll input provided by a user in accordance with an embodiment of the invention.
Figure 4B:
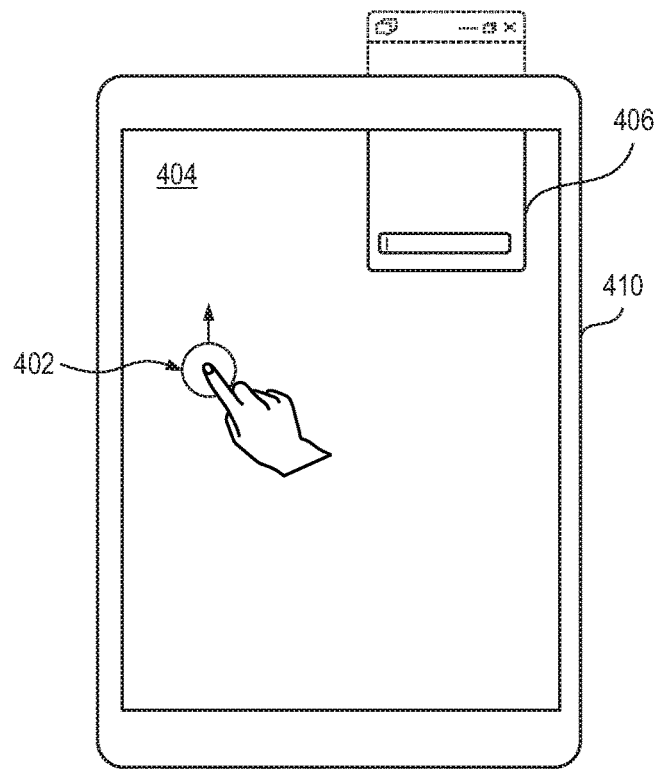
Figure 4C:
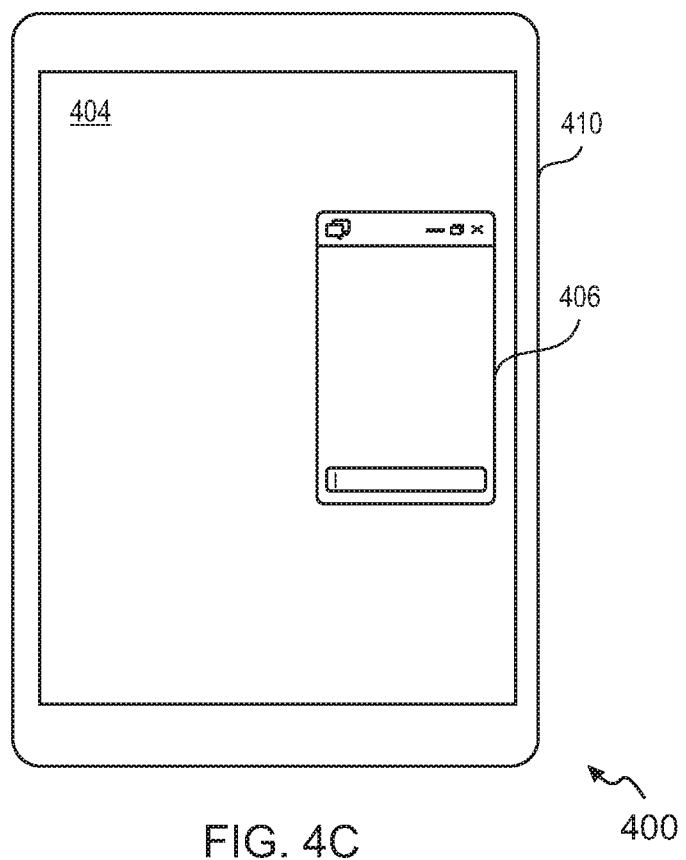

FIGS. 4A-4C depict example representations for illustrating a repositioning of a chat window in response to a Web page scroll input provided by a user in accordance with an embodiment of the invention. More specifically, FIG. 4A shows an example representation 400 of a scroll input 402 being provided by a user on a Web page 404 with a chat window 406 and a virtual keyboard 408 open in a viewport of an electronic device 410 in accordance with an embodiment of the invention. The Web page 404 is depicted to be devoid of content for illustration purposes. It is noted that the Web page 404 may include content, such as text content, images, and the like. FIG. 4B shows an example representation of the scrolling of the chat window 406 along with the scrolling of the Web page 404 in response to the scroll input 402 provided by the user. As explained above, the apparatus 100 of FIG. 1 may cause the chat window to scroll with the Web page and slide back to a previous position subsequent to completion of the scroll movement of the Web page. FIG. 4C shows an example representation of the chat window 406 subsequent to sliding back to the previous position, or more specifically the position of the chat window 406 prior to the receiving the scroll input as depicted in FIG. 4A. Such scrolling of a chat window precludes the jarring/flicker effect caused due to recalculation of the chat window position in conventional mechanisms.

It is noted that FIGS. 4B and 4C are depicted to display only the chat window 406 for illustration purposes. It will be appreciated that the scrolling of the Web page 404 may be enabled with the chat window 406 and the virtual keyboard 408 open and that the chat window 406 may slide to a previous position subsequent to the completion of the scroll movement, as explained above. In addition to overcoming the drawback of the jarring flickering effect experienced in conventional mechanisms, such sliding of the chat window and the regaining its previous position, enables the user to the scroll the Web page when the virtual keyboard is open, thereby improving the user interaction experience.

Referring now to FIG. 1, in at least one example embodiment, the processor 102 is configured to, with the content of the memory 104, cause the apparatus 100 to effect a movement of the chat window from a current position on the Web page to a new position on the Web page selected by the user in response to a drag input corresponding to the chat window provided by the user. More specifically, in some example scenarios, the user may wish to move the chat window from a current location to a different location on the display screen to view the content of the Web page being covered by the chat window. The apparatus 100 may accordingly be caused to recognize a drag input, for example a hold touch input on the chat header for a predefined duration of time, such as a few milliseconds to a second for example, followed by a sliding touch input, provided by the user corresponding to the chat window and, accordingly, may facilitate movement of the chat window to a location desired by the user, or as indicated by completion of the drag input. Such a repositioning of the chat window based on a drag input is explained with reference to FIGS. 5A, 5B and 5C.

Figure 5A:
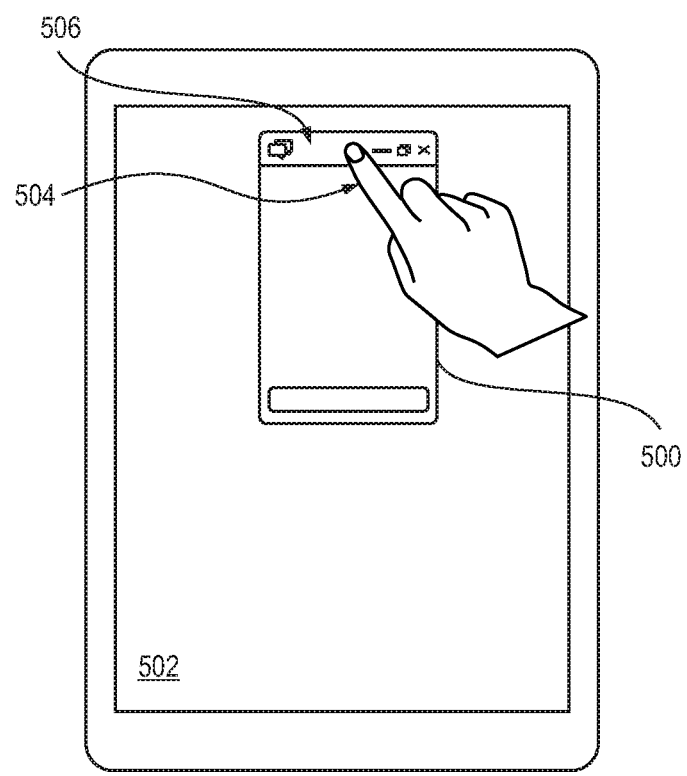
FIGS. 5A-5D depict example representations for illustrating a repositioning of a chat window in response to a drag input provided by a user in accordance with an embodiment of the invention.
Figure 5B:
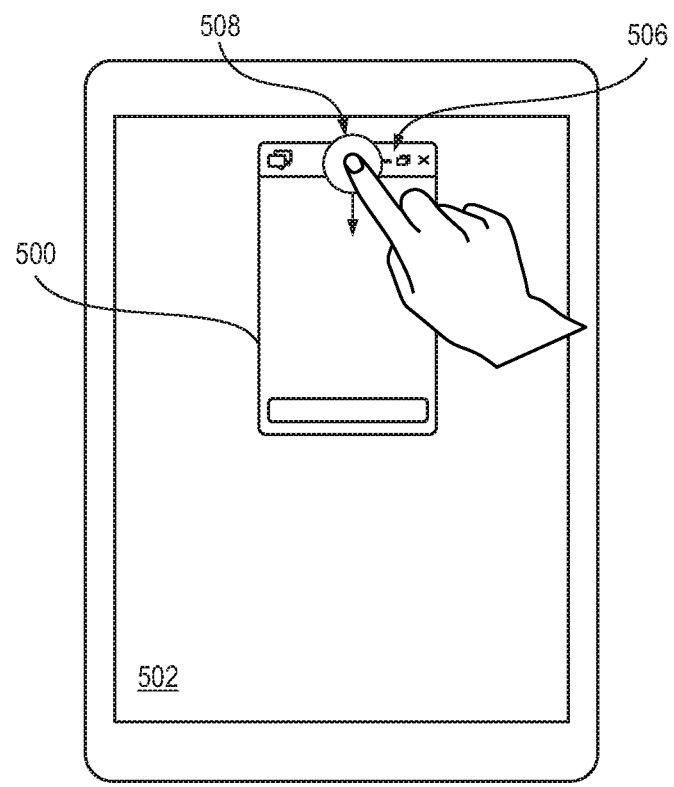
Figure 5C:
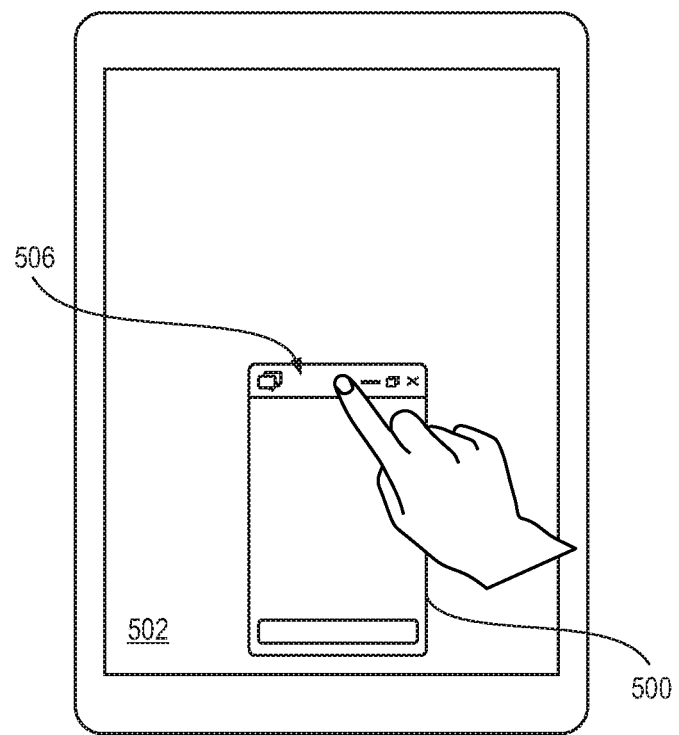
Figure 5D:
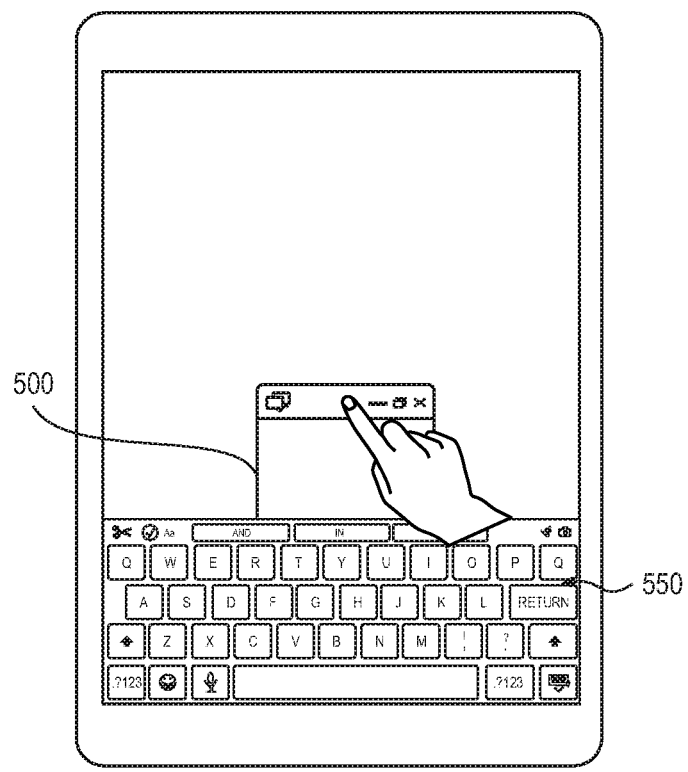

FIGS. 5A-5C depict example representations for illustrating a repositioning of a chat window in response to a drag input provided by a user in accordance with an embodiment of the invention. More specifically, FIG. 5A depicts an example representation of a chat window 500 placed at a current position on a Web page 502 and a user providing a hold input 504 on a chat header section 506. FIG. 5B depicts an example representation of a slide input 506 being provided by a user corresponding to a chat window 500 to drag the chat window 500 on the Web page 502 in accordance with an embodiment of the invention. As explained above, the apparatus 100 may be caused to receive information related to the hold input 504 provided by the user and cause the chat window 500 to be responsive to the slide input 506 provided subsequent to the hold input 504, thereby facilitating dragging of the chat window 500 to a new position, as exemplarily depicted in FIG. 5C. In FIG. 5C, the new position of the chat window 500 is depicted to be a bottom portion of the viewport of the electronic device. If the user provides an indication of providing an input in the text input area of the chat window 500, then a virtual keyboard may be displayed on top of the chat window 500. Such a scenario is depicted in FIG. 5D. More specifically, a virtual keyboard 550 is depicted to be displayed on top of the chat window 500. The user may provide a similar drag input, as explained above, on the chat window 500 to reposition the chat window 500 to another position that does not overlap with the virtual keyboard 550.

Figure 6A:
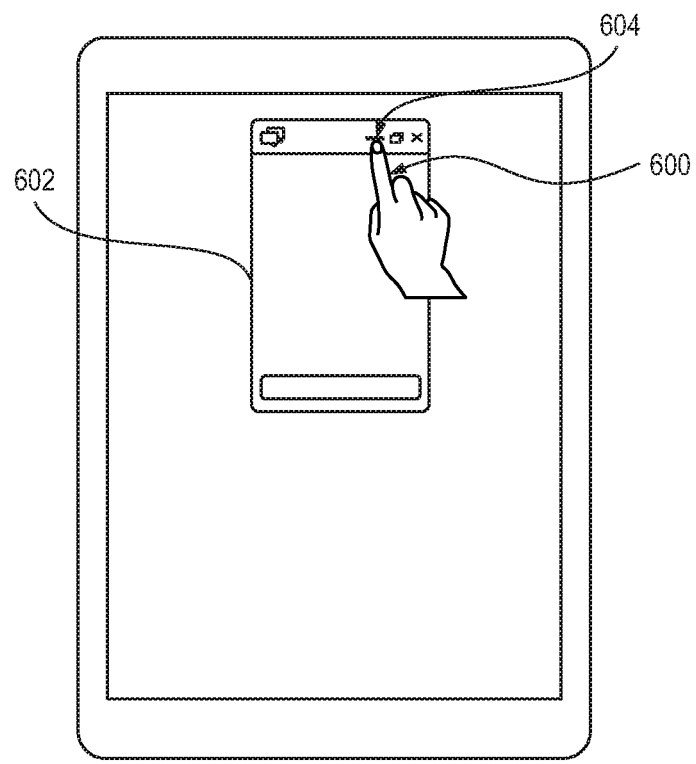
FIGS. 6A-6C depict example representations for illustrating minimization of the chat window to a chat button in accordance with an embodiment of the invention.
Figure 6B:
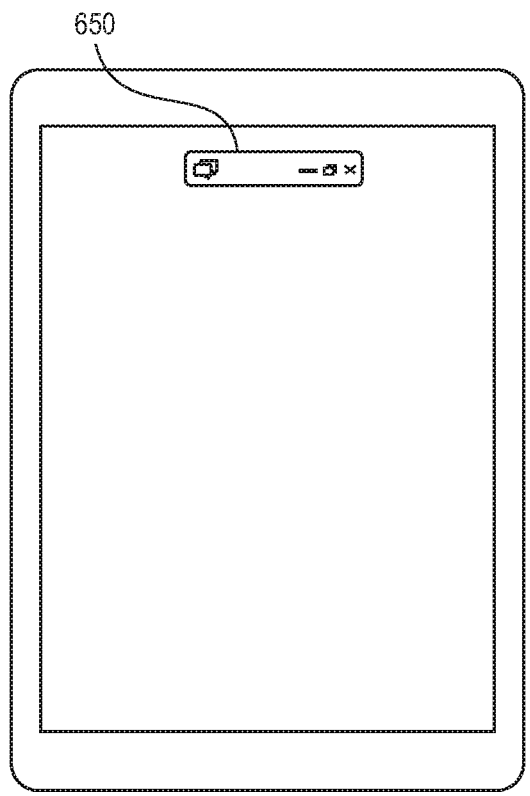
Figure 6C:
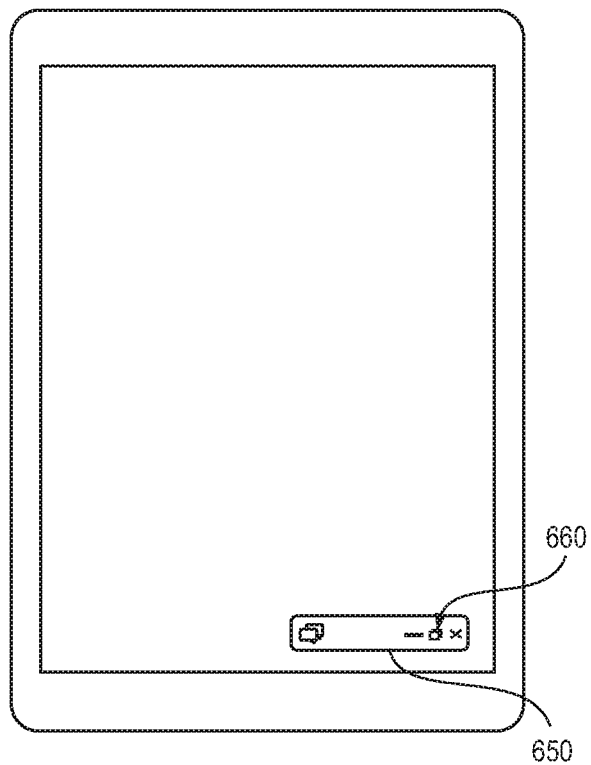

In at least one example embodiment, the apparatus 100 is configured to cause the chat window to collapse to a predetermined minimum size in response to a user input indicative of minimizing a size of the chat window. Such a scenario is depicted in FIGS. 6A-6C. More specifically, FIG. 6A depicts an example representation of a user input 600 being provided by the user to minimize the chat window 602 in accordance with an embodiment of the invention. The user input 600 may be provided as a touch input on an icon 604 associated with minimizing the chat window. In at least one example embodiment, the apparatus 100 may cause the chat window 600 to collapse to a predetermined minimum size in response to the user input 600. In at least one example embodiment, the chat window in the predetermined minimum size configures a chat button, as exemplarily depicted in FIG. 6B. More specifically, FIG. 6B depicts a chat button 650 positioned at a position of the chat window 600 prior to collapsing to the predetermined minimum size in accordance with an embodiment of the invention. In some embodiments, the chat button configured by collapsing of the chat window 600 may be positioned at the first predetermined position, such as the bottom-right corner portion of the viewport, as exemplarily depicted in FIG. 6C. Further, in at least one example embodiment, the apparatus 100 is configured to cause the chat window to regain a maximum size prior to collapsing to the minimum predetermined size subsequent to receiving user input indicative of maximizing a size of the chat window, where the user input provided corresponds to the chat button. For example, the user may provide a selection input of an icon 660 displayed on the chat button 650 to enable the chat window to regain the maximum size, such as the size of the chat window 600 depicted in FIG. 6A. The chat header and/or the chat button are depicted to be devoid of labels for illustration purposes. In at least some embodiments, the chat header and/or the chat button may display descriptive text labels, such as busy, offline, or an action oriented text string such as open, close, and the like. Moreover, the user may also drag the minimized chat button to a new location, maximize the chat button to configure the chat window at the new location, and thereafter minimize the chat window to configure the chat button, again.

Referring now to FIG. 1, in at least one example embodiment, the apparatus 100 is caused to effect an alteration of a size of the chat window to fit completely within the viewport of the electronic device subsequent to repositioning of the chat window to the second predetermined position. As explained above, a chat window displayed to a user may be repositioned to a second predetermined position to accommodate the virtual keyboard. The second predetermined position may be a position above the virtual keyboard, as exemplarily depicted in FIG. 3B. In some example scenarios, a viewport of the electronic device may be associated with a limited size, such as for example a smartphone viewport may not be able to accommodate the chat window positioned above the virtual keyboard in its current form. In such a scenario, the apparatus 100 may be caused to dynamically alter a size of the chat window to fit within the viewport of the electronic device. The dynamic alteration of a size of the chat window is further explained with reference to an illustrative example in FIGS. 7A and 7B.

Figure 7A:
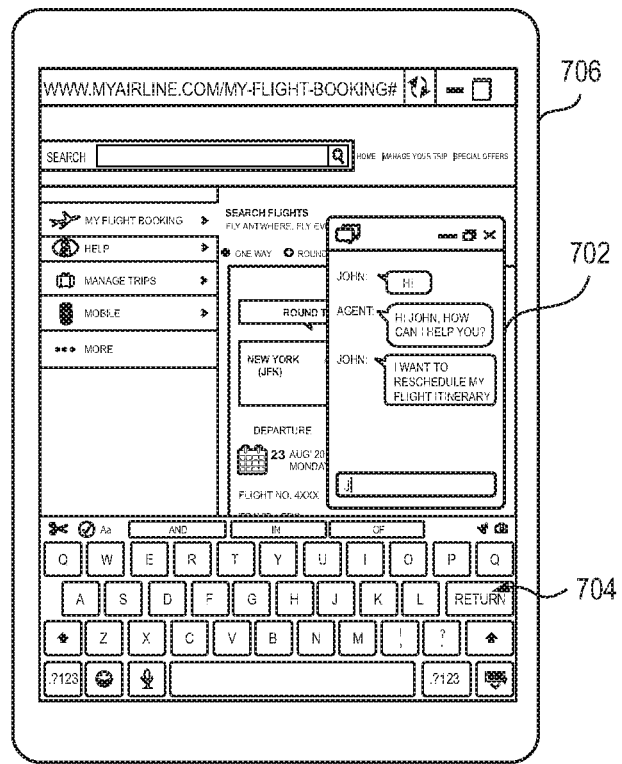
FIGS. 7A and 7B depict example representations for illustration dynamic alteration of a size of the chat window in accordance with an embodiment of the invention.
Figure 7B:
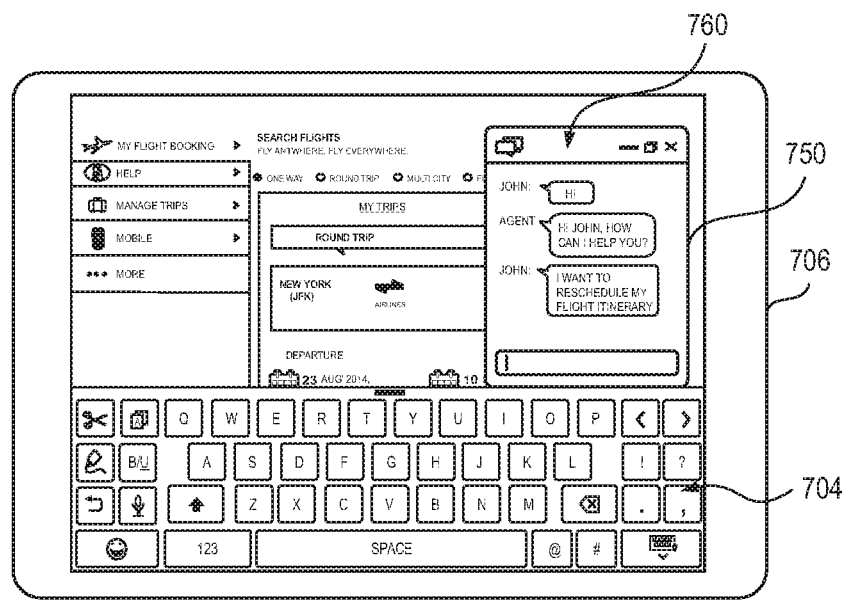

FIGS. 7A and 7B depict example representations for illustration dynamic alteration of a size of the chat window in accordance with an embodiment of the invention. More specifically, FIG. 7A shows a chat window 702 positioned at a second predetermined position above a virtual keyboard 704 in accordance with an embodiment of the invention. As can be seen in FIG. 7A, for a current orientation, or more specifically, a portrait orientation of an electronic device 706, the chat window 702 and the virtual keyboard 704 are capable of being displayed in full size within the viewport of the electronic device 706. However, if an orientation of the electronic device 706 is changed to a landscape orientation, then the chat window 702 on top of the virtual keyboard 704 may not be able to fit within the viewport. Accordingly, the apparatus 100 may be caused to receive information related to a current orientation of the electronic device 706 from the Web server which, in turn, may determine the current orientation of the electronic device 706 based on active tags corresponding to the Web page. The processor 102 of the apparatus 100 may be configured to dynamically alter the size of the chat window 702, as exemplarily depicted by the altered size chat window 750 displayed within the viewport of the electronic device 706 in FIG. 7B. Such dynamic altering of the size of the chat window may prevent the need for the user to scroll to the top of the chat window to view the chat header section 760 or for any such purpose. An example chat interaction between the user and the chat interaction is also depicted in the chat window 750. In some embodiments, the apparatus 100 may be caused to preclude dynamic alteration of the size of a chat window 702, and cause display only of the active field within the chat window, with the chat header section 706 not visible or hidden to the user. The user, in such a scenario, may need to alter the orientation of the device or scroll up to view the chat header section 706.

A method for facilitating a user chat interaction on an enterprise Website is explained with reference to FIG. 8.

Figure 8:
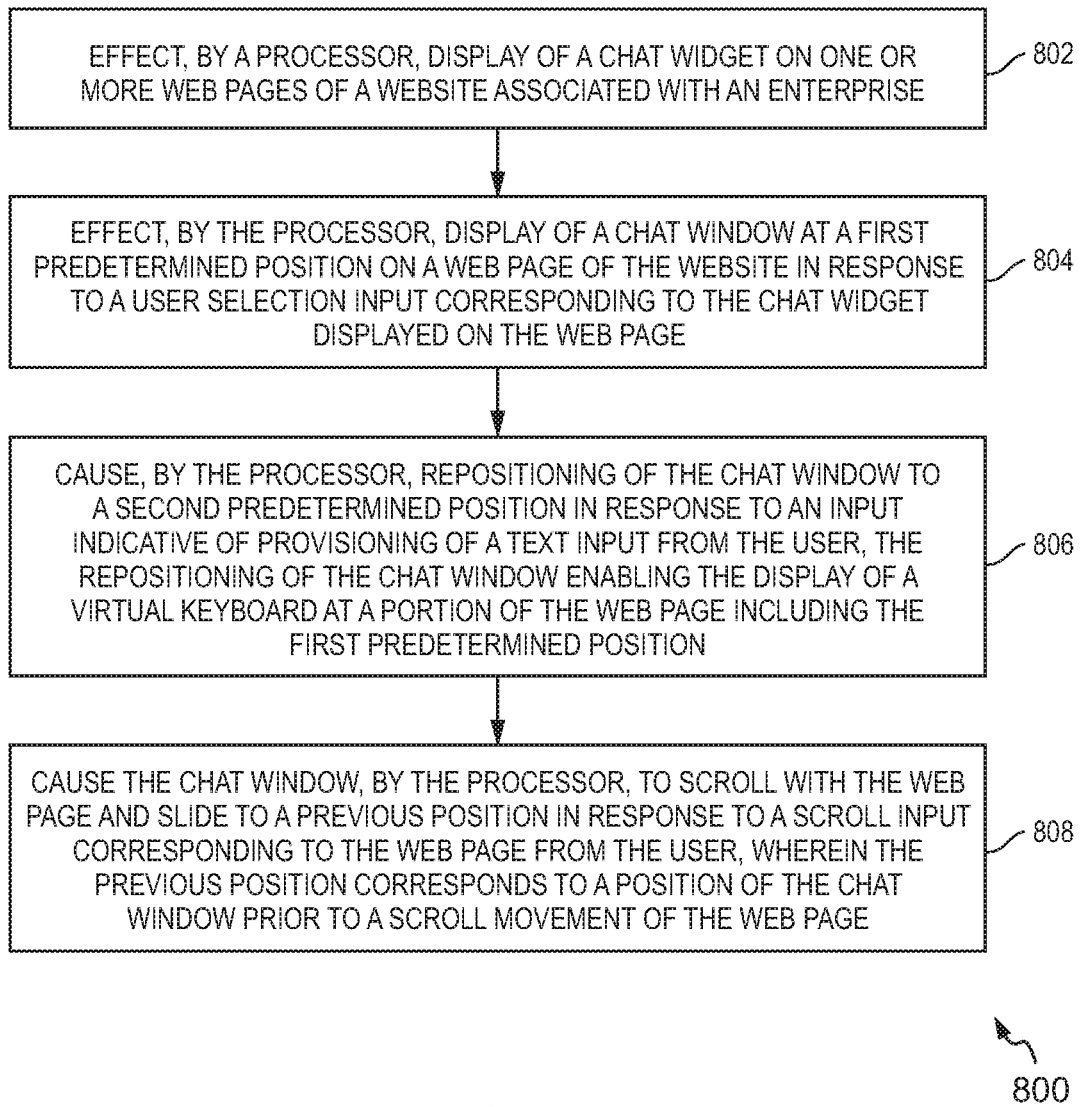
FIG. 8 is a flow diagram of an example method for facilitating a user chat interaction in accordance with an embodiment of the invention.

FIG. 8 is a flow diagram of an example method 800 for facilitating a user chat interaction in accordance with an embodiment of the invention. The method 800 depicted in the flow diagram may be executed by, for example, the apparatus 100 explained with reference to FIGS. 1 to 7B. Operations of the flowchart, and combinations of operation in the flowchart, may be implemented by, for example, hardware, firmware, a processor, circuitry, and/or a different device associated with the execution of software that includes one or more computer program instructions. The operations of the method 800 are described herein with help of the apparatus 100. For example, one or more operations corresponding to the method 800 may be executed by a processor, such as the processor 102 of the apparatus 100. Although the one or more operations are explained herein to be executed by the processor alone, it is understood that the processor is associated with a memory, such as the memory 104 of the apparatus 100, which is configured to store machine executable instructions for facilitating the execution of the one or more operations. The operations of the method 800 can be described and/or practiced by using an apparatus other than the apparatus 100. The method 800 starts at operation 802.

At operation 802 of the method 800, display of a chat widget on one or more Web pages of a Website associated with an enterprise is effected by a processor, such as the processor 102 of the apparatus 100 explained with reference to FIG. 1. The display of the chat widget may be performed to offer chat-based assistance to users visiting the enterprise Website. The display of the chat widget may be performed as depicted in FIG. 2 and is not explained again herein.

At operation 804 of the method 800, display of a chat window at a first predetermined position on a Web page of the Website is effected by the processor in response to a user selection input corresponding to the chat widget displayed on the Web page. As explained with reference to FIGS. 2 and 3A, the user may provide a touch input on the chat widget displayed on the Web page of the Website to seek assistance from an agent, i.e. a customer support representative, of the enterprise. Subsequent to providing such an input, a chat window, such as the chat window depicted in FIG. 3A may be displayed to the user at the first predetermined position. In an example embodiment, the first predetermined position may correspond to a bottom-right corner portion of the viewport of the electronic device. In some embodiments, the chat window may be displayed at a position on the Web page configured to retain display of a substantial portion of the Web page to the user. The chat window is capable of facilitating a chat interaction between the user and an agent associated with the enterprise.

At operation 806 of the method 800, repositioning of the chat window to a second predetermined position is caused by the processor in response to an input indicative of provisioning of a text input from the user. More specifically, the user may click on a text input area to initiate text input corresponding to the chat interaction with the agent. In response to such an input, a virtual keyboard may be displayed to the user. The chat window may be repositioned to a second predetermined position to enable display of a virtual keyboard at a portion of the Web page including the first predetermined position. In an illustrative example, if the chat window was initially positioned at the bottom-right corner portion of the viewport, then upon display of the virtual keyboard, the chat window may be repositioned on top of the virtual keyboard, as depicted in FIG. 3B.

At operation 808 of the method 800, the chat window is caused to scroll with the Web page by the processor in response to a scroll input corresponding to the Web page from the user. As explained above, the display of the chat window and the virtual keyboard retains a display view of a substantial portion of the Web page. The user may provide a scroll input corresponding to the Web page during the chat interaction between the user and the agent. The scroll input causes a scroll movement of the Web page. The chat window is caused to move with the Web page and then slide back to a previous position subsequent to completion of a scroll movement of the Web page. The previous position corresponds to a position of the chat window prior to the scroll movement of the Web page. Such movement of the chat window precludes the need to recalculate the position of the chat window in response to the scroll input and thereby a jarring/flickering effect is precluded.

In at least one example embodiment, a movement of the chat window may be caused by the processor in response to a drag input corresponding to the chat window from the user. The chat window may be moved from a current position on the Web page to a new position on the Web page selected by the user. Further, the chat window may be caused to collapse to a predetermined minimum size in response to a user input indicative of minimizing a size of the chat window. The chat window in the predetermined minimum size may configure a chat button as depicted in FIG. 6B. In an embodiment, the chat button is configured to be positioned at a position of the chat window prior to collapsing to the predetermined minimum size. In an embodiment, the chat button is configured to be positioned at the first predetermined position subsequent to the collapsing of the chat window to the predetermined minimum size. Further, the chat window may be caused to regain a maximum size prior to collapsing to the minimum predetermined size subsequent to receiving user input on the chat button indicative of maximizing a size of the chat window. Some examples of positioning of the chat button are depicted in FIGS. 6B and 6C and are not explained again herein.

In an example embodiment, an alteration of a size of the chat window may also be effected to fit completely within the viewport of the electronic device subsequent to repositioning of the chat window to the second predetermined position. The alteration of the size of the chat window may be performed as explained with reference to FIGS. 7A and 7B and is not explained herein.

Various embodiments disclosed herein provide numerous advantages. The techniques disclosed herein facilitate user chat interactions in a hassle-free manner. The user can scroll the host Website when the chat window and the virtual keyboard are open. Moreover, any jarring or flicker effect due to the scroll input is also precluded. Furthermore, the chat window is configured to be dynamically resized to fit the viewport of the electronic device if an orientation of the electronic device is such that a height of the chat window on top of the virtual keyboard exceeds the screen height. The user may also drag the chat window to any desired position on the screen to view portion of the Website covered by the chat window.

Although various embodiments have been explained with reference to chat interaction between users and agents on the enterprise Website, in some embodiments the chat interaction may be conducted between two users of the Website on the Web page of the enterprise. For example, a user may see a friend, relative, or acquaintance online and seek assistance by clicking on an active widget corresponding to another user. In an illustrative example, an enterprise Website may correspond to a social media Website, such as Facebook®, and the user may chat with a friend on the social media Website using the chat window and the virtual keyboard as depicted in FIG. 3B. The scroll input on the Web page corresponding to the social media Website may cause the chat window to scroll with the Web page and slide to a previous position as explained in FIGS. 4A and 4B.

The disclosed method 800 may be implemented using software including computer-executable instructions stored on one or more computer-readable media, e.g. non-transitory computer-readable media, such as one or more optical media discs; volatile memory components, e.g. DRAM or SRAM); or nonvolatile memory or storage components, e.g. hard drives or solid-state nonvolatile memory components, such as Flash memory components, and executed on a computer, e.g. any suitable computer or image processor embedded in a device, such as a laptop computer, net book, Web book, tablet computing device, smart phone, or other mobile computing device. Such software may be executed, for example, on a single local computer or in a network environment, e.g. via the Internet, a wide-area network, a local-area network, a remote Web-based server, a client-server network, such as a cloud computing network, or other such network using one or more network computers. Additionally, any of the intermediate or final data created and used during implementation of the disclosed methods or systems may also be stored on one or more computer-readable media, e.g. non-transitory computer-readable media, and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable, including fiber optic cable, magnetic communications, electromagnetic communications, including RF, microwave, and infrared communications, electronic communications, or other such communication means.

The embodiments illustrated and described herein as well as embodiments not specifically described herein but within the scope of aspects of the invention constitute examples for facilitating user chat interactions. For example, the elements illustrated and described with reference to FIGS. 1 to 8, when configured, under control of the processor 102 and computer program code in the memory 104 to perform the operations illustrated and described with reference to FIGS. 1 to 7B, constitute effecting display of a chat widget on one or more Web pages of a Website associated with an enterprise; effecting display of a chat window at a first predetermined position on a Web page of the Website in response to a user selection input corresponding to the chat widget displayed on the Web page, the chat window capable of facilitating a chat interaction between the user and an entity associated with the enterprise, the display of the chat window at the first predetermined position configured to retain display of a substantial portion of the Web page to the user; repositioning the chat window to a second predetermined position in response to an input indicative of provisioning of a text input from the user to enable display of a virtual keyboard at a portion of the Web page comprising the first predetermined position; and causing the chat window to scroll with the Web page in response to a scroll input corresponding to the Web page from the user during the chat interaction between the user and the agent, and slide to a previous position subsequent to completion of a scroll movement of the Web page, wherein the previous position corresponds to a position of the chat window prior to the scroll movement of the Web page.

Although the invention has been described with reference to specific exemplary embodiments, it is noted that various modifications and changes may be made to these embodiments without departing from the broad spirit and scope of the invention. For example, the various operations, blocks, etc. described herein may be enabled and operated using hardware circuitry, for example complementary metal oxide semiconductor (CMOS) based logic circuitry; firmware; software and/or any combination of hardware, firmware, and/or software, for example embodied in a machine-readable medium. For example, the apparatuses and methods may be embodied using transistors, logic gates, and electrical circuits, for example application specific integrated circuit (ASIC) circuitry and/or in Digital Signal Processor (DSP) circuitry.

Particularly, the apparatus 100, the processor 102, the memory 104, the I/O module 106, and the communication interface 108 may be enabled using software and/or using transistors, logic gates, and electrical circuits, for example integrated circuit circuitry such as ASIC circuitry. Various embodiments of the invention may include one or more computer programs stored or otherwise embodied on a computer-readable medium, wherein the computer programs are configured to cause a processor or computer to perform one or more operations, for example operations explained herein with reference to FIG. 8. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media, such as floppy disks, magnetic tapes, hard disk drives, etc.; optical magnetic storage media, e.g. magneto-optical disks; CD-ROM (compact disc read only memory); CD-R (compact disc recordable); CD-R/W (compact disc rewritable); DVD (Digital Versatile Disc); BD (BLU-RAY® Disc); and semiconductor memories, such as mask ROM, PROM (programmable ROM), EPROM (erasable PROM), flash memory, RAM (random access memory), etc. Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line, e.g. electric wires, and optical fibers, or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
effecting, by a processor, display of a chat widget in a viewport of a display screen of an electronic device and on one or more Web pages of a Website associated with an enterprise;
effecting, by the processor, display of a chat window at a first position relative to a Web page of the Website in response to a user selection input corresponding to the chat widget displayed on the Web page, the chat window facilitating a chat interaction between a user and an agent associated with the enterprise, the display of the chat window at the first position configured to retain display of a substantial portion of the Web page to the user;
in response to an input indicative of provisioning of a text input from the user, repositioning, by the processor, the chat window to a second position relative to the Web page to display a virtual keyboard at a portion of the Web page comprising the first position and preventing, by the processor, coupling of the chat window to a top portion of the virtual keyboard;
storing, by said processor, an indication of a position of the chat window relative to the viewport of the display screen when the chat window is displayed at the second position relative to the Web page;
in response to a scroll input corresponding to the Web page from the user during the chat interaction between the user and the agent, causing the chat window, by the processor, to scroll with the Web page without recalculating the position of the chat window during the scrolling the chat window with the Web page to maintain the chat window at the second position relative to the Web page during a scroll movement of the Web page that is based on the scroll input; and
subsequent to completion of said scroll movement of the Web page, sliding, by the processor, the chat window to the stored position relative to the viewport of the display screen without recalculating the position of the chat window during the sliding the chat window to the stored position relative to the viewport of the display screen, and
wherein the sliding the chat window to the stored position relative to the viewport of the display screen subsequent to the scroll movement comprises positioning the chat window at a third position relative to the Web page.

2. The method of claim 1, wherein the first position corresponds to a portion of the Web page that is displayed at a bottom-right corner portion of the viewport at a time when the user selection input is received.

3. The method of claim 2, further comprising:
effecting, by the processor, a dynamic alteration of a size of the chat window to fit completely within the viewport of the display screen subsequent to repositioning of the chat window to the second position.

4. The method of claim 3, wherein the electronic device is one of a mobile phone, a Smartphone, a tablet device, and a wearable device.

5. The method of claim 1, further comprising:
in response to a drag input from the user with regard to the chat window, causing, by the processor, a repositioning of the chat window from the third position relative to the Web page to a fourth position relative to the Web page, the fourth position selected by the user.

6. The method of claim 1, further comprising:
causing the chat window to collapse to a predetermined minimum size, by the processor, in response to a user input indicative of minimizing a size of the chat window, the chat window in the predetermined minimum size configuring a chat button.

7. The method of claim 6, wherein the chat button is configured to be positioned at a same location as that of the chat window prior to collapsing to the predetermined minimum size.

8. The method of claim 6, wherein the chat button is configured to be positioned at the first position subsequent to the collapsing of the chat window to the predetermined minimum size.

9. The method of claim 6, further comprising:
causing the chat window, by the processor, to regain a maximum size prior to collapsing to the minimum predetermined size subsequent to receiving user input indicative of maximizing a size of the chat window, the user input provided corresponding to the chat button.

10. The method of claim 1, wherein the agent is one of a human agent and a virtual agent.

11. An apparatus, comprising:
at least one processor;
a display screen; and
a memory having stored therein machine executable instructions, that when executed by the at least one processor, cause the apparatus to:
effect display of a chat widget in a viewport of the display screen and on one or more Web pages of a Website associated with an enterprise;
effect display of a chat window at a first position relative to a Web page of the Website in response to a user selection input corresponding to the chat widget displayed on the Web page, the chat window facilitating a chat interaction between a user and an agent of the enterprise, the display of the chat window at the first position configured to retain display of a substantial portion of the Web page to the user;
in response to an input indicative of provisioning of a text input from the user, reposition the chat window to a second position relative to the Web page to display a virtual keyboard at a portion of the Web page comprising the first position and prevent coupling of the chat window to a top portion of the virtual keyboard;
store an indication of a position of the chat window relative to the viewport of the display screen when the chat window is displayed at the second position relative to the Web page;
in response to a scroll input corresponding to the Web page from the user during the chat interaction between the user and the agent, cause the chat window to scroll with the Web page without recalculating of the position of the chat window during the scrolling the chat window with the Web page to maintain the chat window at the second position relative to the Web page during a scroll movement of the Web page that is based on the scroll input; and
subsequent to completion of said scroll movement of the Web page, slide the chat window to the stored position relative to the viewport of the display screen without recalculating the position of the chat window during the sliding the chat window to the stored position relative to the viewport of the display screen,
wherein the sliding the chat window to the stored position relative to the viewport of the display screen subsequent to the scroll movement comprises positioning the chat window at a third position relative to the Web page.

12. The apparatus of claim 11, wherein the first position corresponds to a portion of the Web page that is displayed at a bottom-right corner portion of the viewport at a time when the user selection input is received.

13. The apparatus of claim 12, wherein the apparatus is further caused to:
effect a dynamic alteration of a size of the chat window to fit completely within the viewport of the display screen subsequent to repositioning of the chat window to the second position.

14. The apparatus of claim 11, wherein the apparatus is further caused to:
in response to a drag input from the user with regard to the chat window, cause a repositioning of the chat window from the third position relative to the Web page to a fourth position relative to the Web page, the fourth position selected by the user.

15. The apparatus of claim 11, wherein the apparatus is further caused to:
cause the chat window to collapse to a predetermined minimum size in response to a user input indicative of minimizing a size of the chat window, the chat window in the predetermined minimum size configuring a chat button.

16. The apparatus of claim 15, wherein the chat button is configured to be positioned at one of:
a position of the chat window prior to collapsing to the predetermined minimum size; and
the first position, subsequent to the collapsing of the chat window to the predetermined minimum size.

17. A computer-implemented method, comprising:
effecting, by a processor, display of a chat window at a first position relative to a Web page of a Website associated with an enterprise, the Web page displayed in a viewport of a display screen of an electronic device and the chat window facilitating a chat interaction between a user and an agent associated with the enterprise;
in response to an input indicative of provisioning of a text input from the user, repositioning the chat window to a second position relative to the Web page to display a virtual keyboard at a portion of the Web page comprising the first position and preventing coupling of the chat window to a top portion of the virtual keyboard;
storing, by the processor, an indication of a position of the chat window relative to the viewport of the display screen when the chat window is displayed at the second position relative to the Web page;
in response to a scroll input directed to the Web page received from the user, causing the chat window, by the processor, to scroll with the Web page without recalculating the position of the chat window during the scrolling the chat window with the Web page to maintain the chat window at the second position relative to the Web page during a scroll movement of the Web page that is based on the scroll input;
subsequent to completion of the scroll movement of the Web page, sliding the chat window to the stored position relative to the viewport of the display screen without recalculating the position of the chat window by scrolling the chat window with during the sliding the chat window to the stored position relative to the viewport of the display screen,
wherein the sliding the chat window to the stored position relative to the viewport of the display screen subsequent to the scroll movement comprises positioning the chat window at third position relative to the Web page.

* * * * *